US010356737B2

(12) United States Patent
Ringh et al.

(10) Patent No.: US 10,356,737 B2
(45) Date of Patent: Jul. 16, 2019

(54) CELL SEARCH PROCEDURE FRAME FORMAT

(71) Applicant: Telefonaktiebolaget L M Ericsson (publ), Stockholm (SE)

(72) Inventors: Emil Ringh, Stockholm (SE); Mona Hashemi, Göteborg (SE); Jingya Li, Gothenburg (SE); Henrik Sahlin, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/697,408

(22) Filed: Apr. 27, 2015

(65) Prior Publication Data

US 2016/0316444 A1    Oct. 27, 2016

(51) Int. Cl.
*H04W 56/00* (2009.01)
*H04W 4/06* (2009.01)
*H04W 72/00* (2009.01)
*H04L 5/00* (2006.01)

(52) U.S. Cl.
CPC ....... *H04W 56/0015* (2013.01); *H04L 5/0048* (2013.01); *H04W 4/06* (2013.01); *H04W 72/005* (2013.01); *H04L 5/0007* (2013.01)

(58) Field of Classification Search
None
See application file for complete search history.

(56) References Cited

U.S. PATENT DOCUMENTS

| 2010/0182903 | A1* | 7/2010 | Palanki | H04L 1/0041 370/225 |
| 2010/0279707 | A1* | 11/2010 | Fischer | G01S 5/021 455/456.1 |
| 2011/0243104 | A1 | 10/2011 | Swarts et al. | |
| 2012/0307726 | A1* | 12/2012 | Pi | H04J 11/0069 370/328 |

(Continued)

FOREIGN PATENT DOCUMENTS

WO    2012165904    12/2012

OTHER PUBLICATIONS

C. Nicolas Barati et al., "Directional Cell Search for Millimeter Wave Cellular Systems" arXiv 1404 5068v1 [cs.IT], Apr. 20, 2014, 10 pages.

(Continued)

*Primary Examiner* — Yemane Mesfin
*Assistant Examiner* — Jeff Banthrongsack
(74) *Attorney, Agent, or Firm* — Sage Patent Group

(57) ABSTRACT

According to some embodiments, a method of synchronizing a wireless device with a network node comprises receiving a radio subframe transmitted from the network node. The MBSFN radio subframe comprises a first Primary Synchronization Signal (PSS) associated with a first Orthogonal Frequency Division Multiplexing (OFDM) symbol and paired with a first Secondary Synchronization Signal (SSS) associated with a second OFDM symbol. The method further comprises detecting the first PSS and detecting the first SSS within the radio subframe. The method determines system information associated with the network node based on the detected PSS and SSS. The radio subframe is transmitted from the network node as a Multimedia Broadcast Multicast Services Single-Frequency Network (MBSFN) subframe.

16 Claims, 16 Drawing Sheets

(56) References Cited

U.S. PATENT DOCUMENTS

| | | |
|---|---|---|
| 2013/0094411 A1 | 4/2013 | Zhang |
| 2013/0176952 A1 | 7/2013 | Shin et al. |
| 2013/0229953 A1 | 9/2013 | Nam et al. |
| 2013/0235851 A1 | 9/2013 | Abu-Surra |
| 2014/0050206 A1 | 2/2014 | Seo et al. |
| 2014/0204826 A1 | 7/2014 | Ekpenyong |
| 2015/0055574 A1 | 2/2015 | Kim |
| 2016/0127098 A1 | 5/2016 | Ng et al. |

OTHER PUBLICATIONS

Hashemi et al., Cell Search Procedure Frame Format patent application, U.S. Appl. No. 14/718,803, filed May 21, 2015, 42 pages.
S. Rangan et al., "Millimeter Wave Cellular Wireless Networks: Potentials and Challenges," arXiv 1401 .2560v1 [cs NI], Jan. 11, 2014, 17 pages.
Technical Specification, ESI, "LTE. Evolved Universal Terrestrial Radio Access (E-UTRA); Physical channels and modulation (3GPP TS 36.211 version 11.2.0 Release 11)," ETSI TS 136 211 V11.2.0 (Apr. 2013), European Telecommunications Standards Institute 2013, 110 pages.
Technical Specification, "Lte, 3rd Generation Partnership Project: Technical Specification Group Radio Access Network; Evolved Universal Terrestrial Radio Access (E-UTRA); Physical layer procedures (Release 12)," 3GPP TS 36.213 V12.1.0 (Mar. 2014), 2014, 3GPP Organizational Partners (ARIB, ATIS, CCSA, ETSI, TTA, TIC); 186 pages.
Sahlin et al., Cell Search Procedure Frame Format patent application, U.S. Appl. No. 14/541,922, filed Nov. 14, 2014, 50 pages.
PCT, Notification of Transmittal of the International Search Report and the Written Opinion of the International Searching Authority, or the Declaration, Application No. PCT/IB2015/056441, dated Nov. 20, 2015.
PCT, Notification of Transmittal of the International Search Report and the Written Opinion of the International Searching Authority, or the Declaration, Application No. PCT/IB2015/054245, dated Sep. 29, 2015.
Dahlman et al., 4G: LTE/LTE-Advanced for Mobile Broadband, 2nd Edition, Hardcover ISBN: 9780124199859, eBook ISBN: 9780124199972, © Academic Press 2014, (book cover, first page, copyright page, Section 14.1—Acquisition and cell search, 14.1.1, 14.1.2 and 14.1.3), Published Date: Oct. 29, 2013.
Henrik Sahlin et al., U.S. Appl. No. 14/541,922, Non-Final Rejection, dated Mar. 23, 2017.
USPTO, Non-Final Office Action for U.S. Appl. No. 14/718,803, filed May 21, 2015.
Mona Hashemi et al., U.S. Appl. No. 14/718,803 Non-Final Rejection, dated Apr. 13, 2017.

* cited by examiner

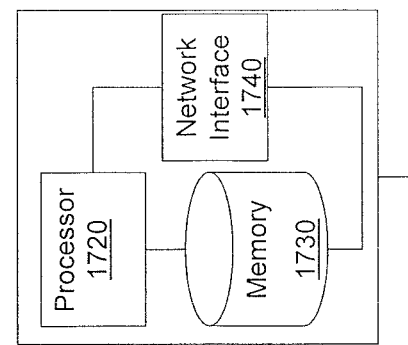
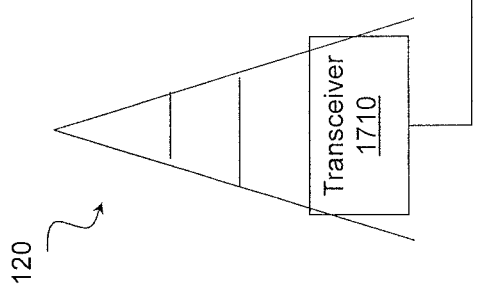
Fig. 17
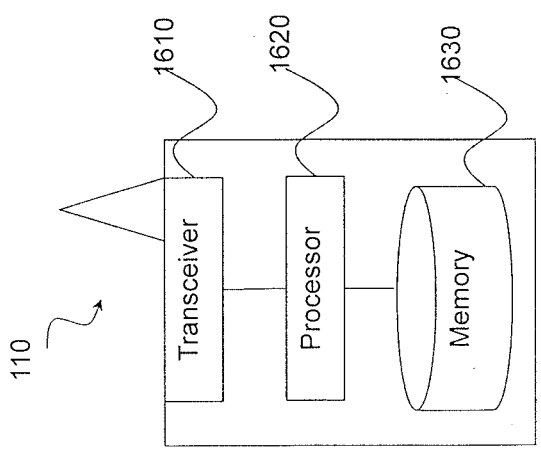
Fig. 16

CELL SEARCH PROCEDURE FRAME FORMAT

TECHNICAL FIELD

Particular embodiments relate generally to synchronization signals in wireless communications, and more particularly to frame formats for cell search procedure synchronization signals.

BACKGROUND

When a wireless device powers on or moves between cells in a wireless network, the wireless device receives and synchronizes to downlink signals in a cell search procedure. The cell search procedure identifies a preferable cell and performs time and frequency synchronization to the network in downlink (e.g., from a base station to a user equipment).

A user equipment (UE) may use primary and secondary synchronization signals (PSS and SSS), such as those described in Section 6.11 of Third Generation Partnership Project (3GPP) TS 36.211, version 11.2.0, for performing a cell search procedure, such as the cell search procedure described in Section 4.1 of 3GPP TS 36.213, version 12.1.0.

FIG. 1 illustrates an example radio frame and locations of OFDM symbols used for PSS and SSS, according to a 3GPP specification. The X-axis represents orthogonal frequency division multiplexing (OFDM) symbols 112 and the Y-axis represents subcarriers 114. Each resource element 113 corresponds to one OFDM subcarrier 114 during one OFDM symbol interval 112. Particular OFDM symbols 112 include PSS 116 and SSS 118.

3GPP specifies that for frequency division duplex (FDD) PSS 116 is transmitted in the last OFDM symbol of slots 0 and 10 within a radio frame and that SSS 118 is transmitted in the OFDM symbol preceding PSS, such as illustrated in FIG. 1.

3GPP specifies that for time division duplex (TDD) PSS is transmitted in the third OFDM symbol of slots 3 and 13 within a frame and that SSS is transmitted in the last OFDM symbol of slots 2 and 12 (i.e., three symbols ahead of the PSS).

FIG. 2 illustrates an example of an initial cell search procedure. A UE typically may have a frequency error of 2 to 20 ppm (part per million) at power on. This corresponds to 40 to 400 kHz frequency error at a carrier frequency of 2 GHz. The UE then tries to detect a PSS. From the detected PSS, the UE may derive the cell id within a cell-identity group, which consists of three different cell identities corresponding to three different PSS. To perform the detection, the UE searches for all of the three possible cell identities. The UE may also achieve OFDM symbol synchronization and determine a coarse frequency offset estimation with an accuracy of about 1 kHz. The UE estimates the latter by evaluating several hypotheses of the frequency error.

The UE then detects the SSS. From the detected SSS, the UE acquires the physical cell id and achieves radio frame synchronization. The UE also detects whether the cyclic prefix length is normal or extended. A UE that is not preconfigured for a particular duplex mode (e.g., TDD or FDD) may detect the duplex mode by the frame position of the detected SSS in relation to the detected PSS. The UE may estimate fine frequency offset by correlating PSS and SSS. Alternatively, the UE may use cell-specific reference signals (CRS) to estimate fine frequency offset.

After synchronizing with the PSS and the SSS, the UE may receive and decode cell system information, which contains cell configuration parameters such as the Physical Broadcast Channel (PBCH). The number of OFDM symbols used for PDCCH (Physical Downlink Control Channel) is signaled by PCFICH (Physical Control Format Indicator Channel) according to Section 6.7 of 3GPP TS 36.211, version 11.2.0. The PCFICH is decoded before the UE receives PDCCH. The number of OFDM symbols signaled by PCFICH may be 1, 2 or 3 for large bandwidth allocations (e.g., more than 10 resource blocks) and 2, 3 or 4 OFDM symbols for small bandwidths (e.g., less than or equal to 10 resource blocks). The first OFDM symbols of a sub-frame are used for PDCCH.

Multimedia Broadcast Multicast Services Single-Frequency Network (MBSFN) is an LTE format for transmitting multicast/broadcast information (i.e., transmissions that are of interest to many users in the system). The LTE standard, however, does not require that MBSFN subframes contain broadcast information. The MBSFN subframe only contains broadcast information if the Physical Multicast Channel (PMCH) is mapped accordingly.

SUMMARY

According to some embodiments, a method of synchronizing a wireless device with a network node comprises receiving a radio subframe transmitted from the network node. The radio subframe comprises a first Primary Synchronization Signal (PSS) associated with a first Orthogonal Frequency Division Multiplexing (OFDM) symbol and paired with a first Secondary Synchronization Signal (SSS) associated with a second OFDM symbol. The method further comprises detecting the first PSS within the radio subframe and detecting the first SSS within the radio subframe. The method determines system information associated with the network node based on the detected PSS and the detected SSS. The radio subframe is transmitted from the network node as a Multimedia Broadcast Multicast Services Single-Frequency Network (MBSFN) subframe.

In particular embodiments, the radio subframe further comprises a second PSS associated with a third OFDM symbol and paired with a second SSS associated with a fourth OFDM symbol.

In particular embodiments, the method comprises detecting both the first PSS and the second PSS within the radio subframe and accumulating the first PSS and the second PSS. The method further comprises determining system information associated with the network node based on the accumulated first PSS and second PSS.

Particular embodiments may exhibit some of the following technical advantages. Particular embodiments may include a PSS and SSS cell search frame format that is backward compatible such that legacy UEs will not detect these cell search signals or need to be aware of their existence. Particular embodiments use synchronization sequences other than those specified in LTE release 12. In particular embodiments, cell search signals are placed in MBSFN subframes so that UEs are not scheduled at the time-frequency resources used for PSS/SSS transmission. In particular embodiments, PSS and SSS frame formats may use a large fraction of the reserved resource blocks which results in low overhead. Particular embodiments may allocate PSS/SSS pairs in subsequent OFDM symbols such that a high resolution frequency offset estimate can be calculated with low computational complexity.

In particular embodiments, a PSS/SSS pair is not transmitted such that PSS is transmitted in one slot and SSS in the next, or vice versa. The first symbol of each slot has a longer cyclic prefix than the other OFDM symbols of the slot. In embodiments that transmit a PSS/SSS pair in the same slot, the timing between PSS and SSS within each pair is constant, such that the phase rotation between PSS and SSS may be used for a fine granularity frequency offset estimator. In particular embodiments, a UE may use coherent accumulation to improve the received SINR. In particular embodiments, a base station may use beamforming or repetition of PSS and SSS to increase successful cell detection rate and reduce cell detection latency. Other technical advantages will be readily apparent to one skilled in the art from the following figures, description and claims.

BRIEF DESCRIPTION OF THE DRAWINGS

For a more complete understanding of the present invention and its features and advantages, reference is now made to the following description, taken in conjunction with the accompanying drawings, in which:

FIG. 16 is a block diagram illustrating an example embodiment of a wireless device; and FIG. 17 is a block diagram illustrating an example embodiment of a radio network node.

DETAILED DESCRIPTION

Figure 1:
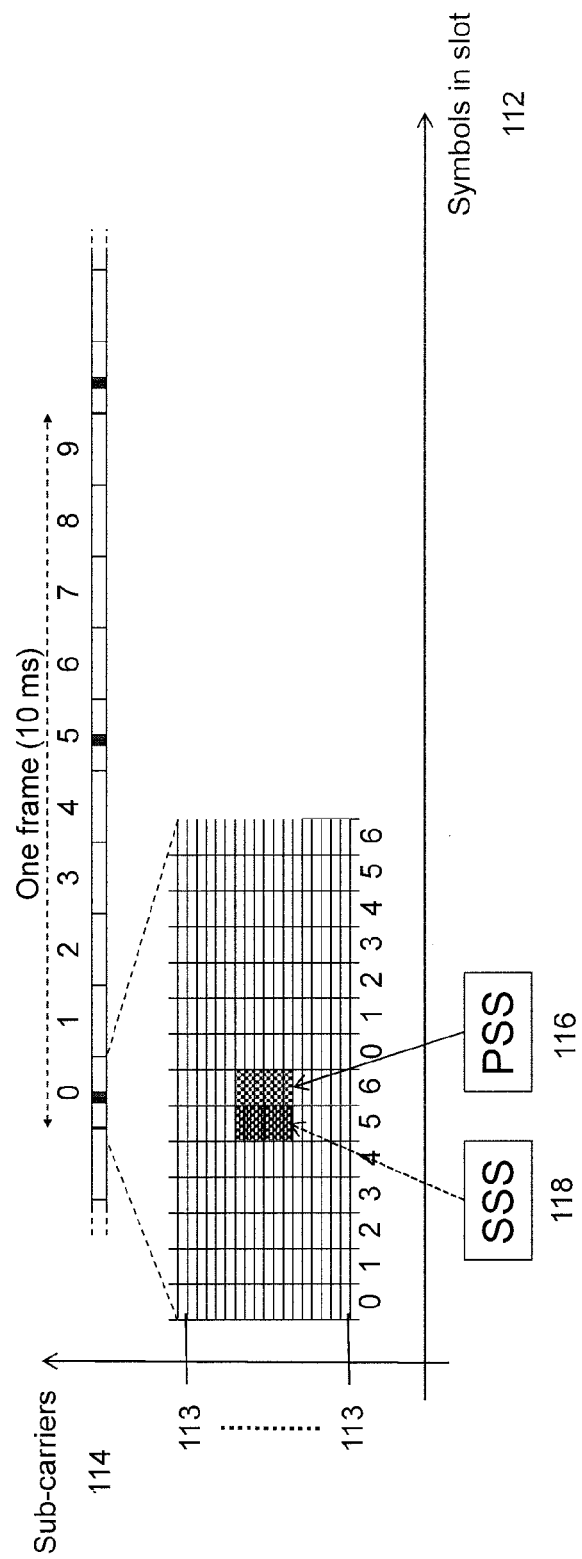
FIG. 1 illustrates an example radio frame and locations of OFDM symbols used for PSS and SSS, according to a 3GPP specification.
Figure 2:
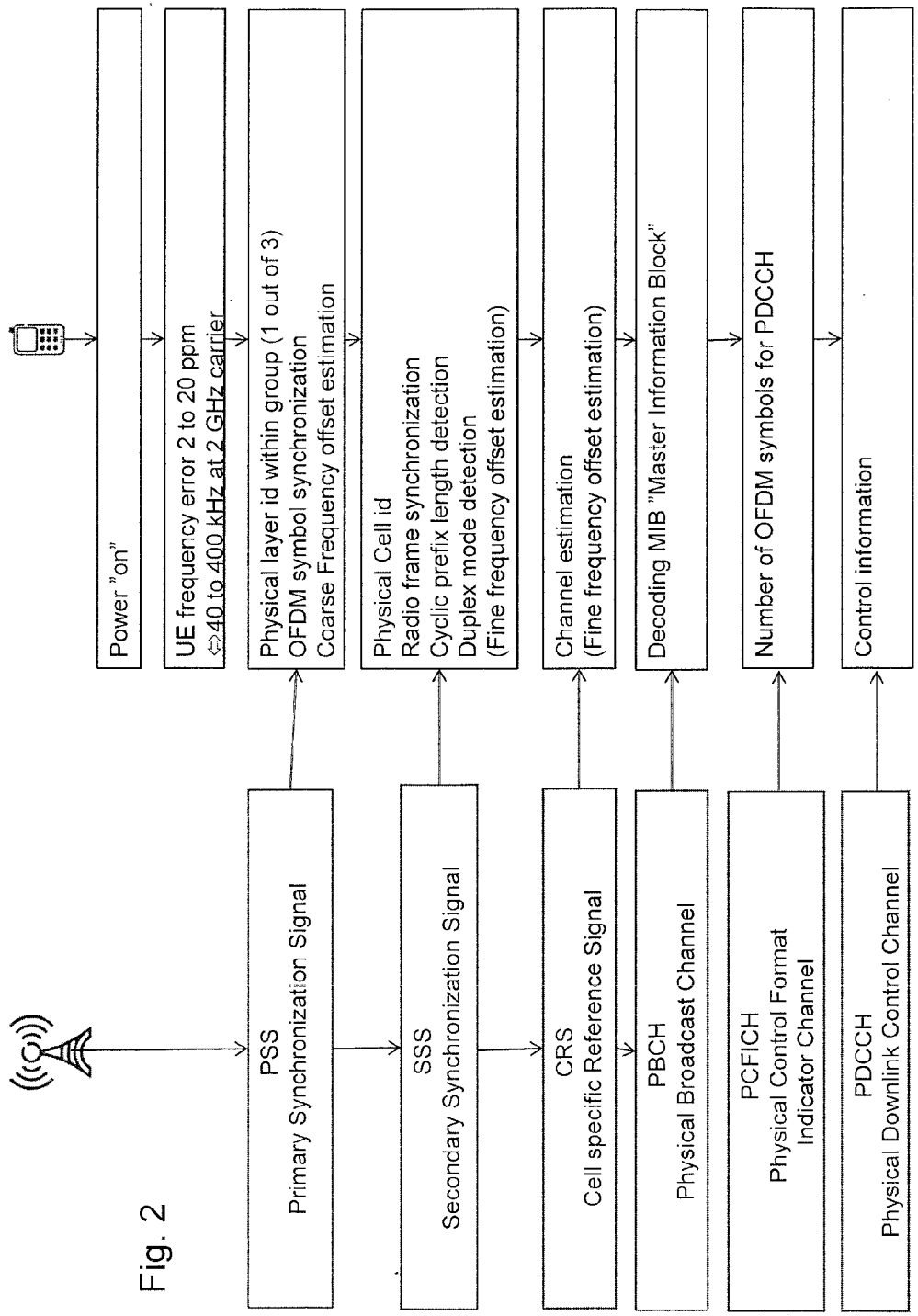
FIG. 2 is a flowchart of an example method for performing cell search synchronization, according to a particular embodiment.

In particular networks, a UE might receive cell search signals at a low signal to interference plus noise ratio (SINR), which results in degraded or impossible cell attachment. 3GPP specifies that the same synchronization signals are transmitted each 5 ms (e.g., as illustrated in FIG. 1). A UE might attempt to accumulate several occasions of these signals; however, fading radio channel and frequency errors negatively impact this possibility. A fading radio channel exhibits time variations both in amplitude and phase. The speed of these variations depends on both the speed of the UE and how the radio propagation environment is changing. In both cases, these variations may result in received signals that cannot be accumulated coherently in order to increase SINR. The phase variations may lead to a destructive superposition at this accumulation.

An alternative may be for a UE to use a non-coherent accumulation in its receiver. Non-coherent accumulation, however, does not increase the SINR. It only improves the statistics of the receiver (i.e., the sensitivity to variations in individual noise samples).

A particular technique to improve coverage of cell search signals uses several antenna elements and beamforming to improve the SINR. A directional cell search procedure is proposed by C. Nicolas Barati et al. in "Directional Cell Search for Millimeter Wave Cellular Systems", Cornell University Library. In this procedure a base station periodically transmits synchronization signals in random directions to scan the angular space. The need for synchronization and broadcast signals that can be used in the initial cell search for scanning over a range of angles is discussed by Sundeep Rangan et al. in "Millimeter-Wave Cellular Wireless Networks: Potentials and Challenges", Proceedings of the IEEE, Volume: 102, Issue 3, 2014, pages 366-385. Another technique to improve coverage of cell search signals is described in U.S. patent application Ser. No. 14/541,922 filed on Nov. 14, 2014, titled "Cell Search Procedure Frame Format."

An object of the present disclosure is to obviate at least these disadvantages and provide an improved method to transmit synchronization signals with a density and directionality that enables successful cell search in low SINR environments. As discussed above, the MBSFN subframe only contains broadcast information if the Physical Multicast Channel (PMCH) is mapped accordingly. Thus, the MBSFN subframe format may also be used as a flexible format for DL transmissions. In particular embodiments, more PSS/SSS pairs may be included in a MBSFN subframe than other subframe types. For example, the MBSFN subframe does not include CRS (among other signals) and thus more OFDM symbols may be available for PSS/SSS pairs. Particular embodiments are described with reference to FIGS. 1-17 of the drawings, like numerals being used for like and corresponding parts of the various drawings. LTE is used throughout this disclosure as an example cellular system, but the ideas presented herein apply to other wireless communication systems as well.

Figure 3:
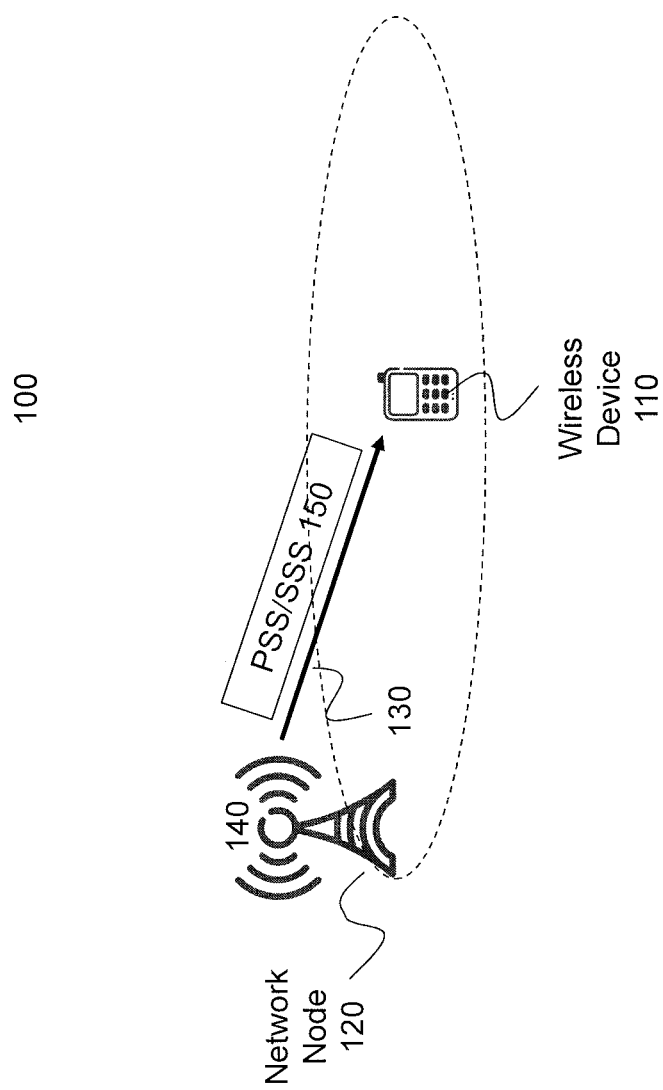
FIG. 3 is a block diagram illustrating an example of a network, according to a particular embodiment.

FIG. 3 is a block diagram illustrating an example of a network, according to a particular embodiment. Network 100 includes radio network node 120 (such as a base station or eNodeB) and wireless devices 110 (such as mobile phones, smart phones, laptop computers, tablet computers, or any other devices that can provide wireless communication). In general, wireless devices 110 that are within coverage of radio network node 120 communicate with radio network node 120 by transmitting and receiving wireless signals 130. For example, wireless devices 110 and radio network node 120 may communicate wireless signals 130 containing voice traffic, data traffic, and/or control signals. Wireless signals 130 may include both downlink transmissions (from radio network node 120 to wireless devices 110) and uplink transmissions (from wireless devices 110 to radio network node 120). Wireless signals 130 may include synchronization signals, such PSS and SSS. Wireless device 110 may detect the synchronization signals to determine system information for network 100.

Wireless signals 130 comprise radio frames which in turn comprise subframes. Different subframes may comprise different formats. A particular subframe format is the MBSFN subframe format. A MBSFN subframe may contain multicast/broadcast information, or it may contain other information as described in more detail herein. Particular example formats for MBSFN radio subframes are illustrated in FIGS. 4-13 described below.

Radio network node 120 transmits and receives wireless signals 130 using antenna 140. In particular embodiments, radio network node 120 may comprise multiple antennas 140. For example, radio network node 120 may comprise a multi-input multi-output (MIMO) system with two, four, or eight antennas 140.

In network 100, each radio network node 120 may use any suitable radio access technology, such as long term evolution (LTE), LTE-Advanced, UMTS, HSPA, GSM, cdma2000, WiMax, WiFi, and/or other suitable radio access technology. Network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 16 below. Similarly, a radio network node may include any suitable combination of hardware and/or software. For example, in particular embodiments, a radio network node, such as radio network node 120, may include the components described with respect to FIG. 17 below.

This disclosure describes several frame formats for transmitting and receiving synchronization signals using LTE as an example. Particular embodiments may be applicable to both FDD and TDD subframes that can be scheduled as an MBSFN subframe (i.e., all downlink subframes except 0, 4, 5 and 9 in FDD and 0, 1, 5, and 6 in TDD). According to 3GPP 36.211 Section 6.10.2, if PMCH is not mapped to the MBSFN subframe, then no MBSFN-reference signals are transmitted. The subframe will then also use the same cyclic prefix length as subframe number 0 (see 36.211 Section 6.1). If PMCH is mapped to the MBSFN-region of the subframe, then this part of the subframe will use extended cyclic prefix.

In legacy systems, SSS and PSS are placed at subcarriers centered on the DC carrier. Such a configuration enables a UE to detect them without knowing the total system bandwidth. In particular embodiments, SSS and PSS are also placed at subcarriers centered on the DC carrier, but in a different subframe than legacy SSS and PSS. FIGS. 4-13 illustrate example locations of primary and secondary search signals within a subframe, according to particular embodiments.

Figure 4:
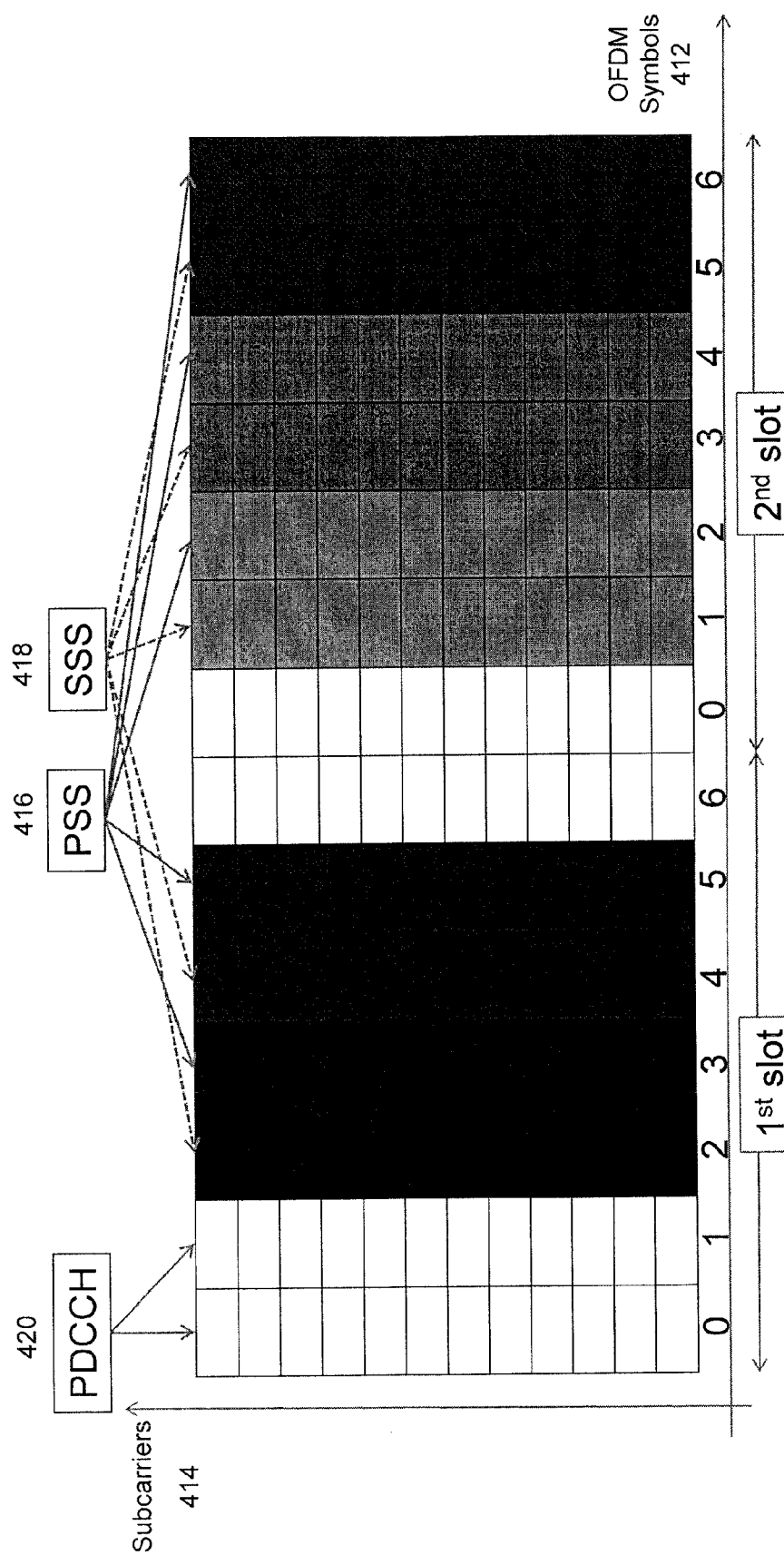
FIGS. 4-13 illustrate example locations of primary and secondary search signals within a MBSFN subframe, according to particular embodiments.

FIG. 4 illustrates an example MBSFN cell search subframe format for FDD using normal cyclic prefix. FIG. 4 illustrates two slots of an example subframe. Each slot comprises a plurality of OFDM symbols 412, illustrated on the horizontal axis, and a plurality of subcarriers 414, illustrated on the vertical axis. The first two OFDM symbols of the first slot include PDCCH 420. The remaining OFDM symbols may include pairs of PSS 416 and SSS 418.

In the illustrated embodiment, the first slot includes a PSS/SSS pair in symbols 2 and 3 and another PSS/SSS pair in symbols 4 and 5. The second slot includes PSS/SSS pairs in symbols 1 and 2, 3 and 4, and 5 and 6. In particular embodiments, the PSS/SSS pairs in the first slot may include symbols 3 and 4, and 5 and 6.

In the illustrated embodiment, the PSS/SSS pairs are shown in adjacent OFDM symbols with the SSS transmitted before the PSS. A particular advantage of this ordering is that the order matches the legacy PSS/SSS ordering, which may enable reuse of some existing hardware or software components. In particular embodiments, the PSS/SSS pairs may include OFDM symbols that are not adjacent. In particular embodiments, PSS may be transmitted before SSS. Particular embodiments may include any suitable combination. For example, some PSS/SSS pairs within the subframe may be adjacent and some may not. Some PSS/ SSS pairs within the subframe may transmit SSS before PSS and others may transmit after.

In particular embodiments, the PSS sequence may comprise the same sequence for some or all PSS/SSS pairs. In particular embodiments, the SSS sequence may comprise a different sequence for some or all PSS/SSS pairs.

Figure 5:
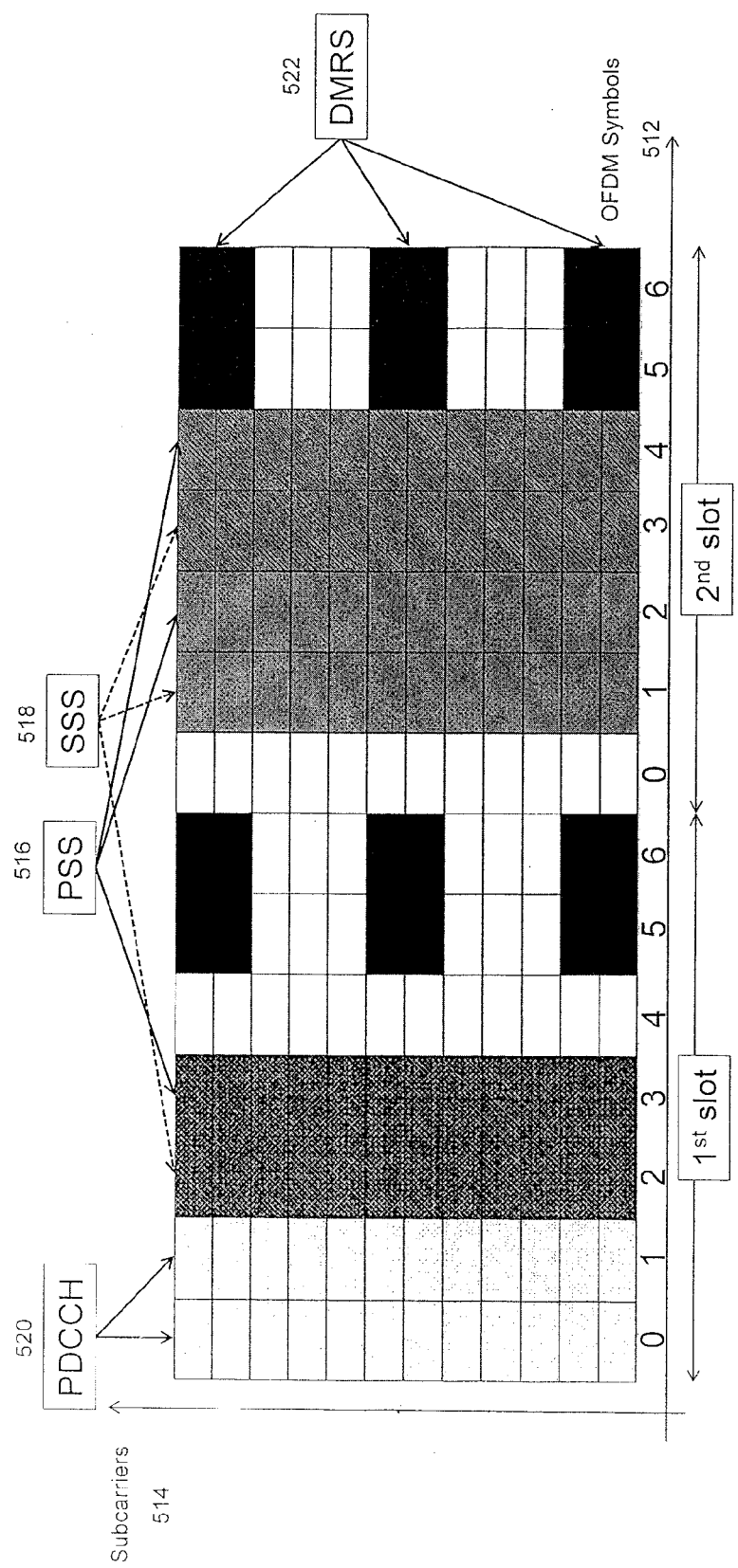

The example in FIG. 4 illustrates an embodiment where the MBSFN subframe is only used for PSS/SSS transmission. FIG. 5 illustrates an example embodiment with unicast data included in the resource elements. DMRS is mapped to the MBSFN subframe to support demodulation of the unicast data.

FIG. 5 illustrates another example MBSFN cell search subframe format for FDD using normal cyclic prefix. FIG. 5 illustrates two slots of an example subframe. Each slot comprises a plurality of OFDM symbols 512, illustrated on the horizontal axis, and a plurality of subcarriers 514, illustrated on the vertical axis. The first two OFDM symbols of the first slot include PDCCH 520. Symbols 5 and 6 of both the first and second slots include DMRS 522. The remaining OFDM symbols may include pairs of PSS 516 and SSS 518.

In the illustrated embodiment, the first slot includes a PSS/SSS pair in symbols 2 and 3. The second slot includes PSS/SSS pairs in symbols 1 and 2, and 3 and 4. In particular embodiments, the PSS/SSS pairs may include any suitable combination of symbols not occupied by PDCCH 520 and DMRS 522.

DMRS 522 is only present in the MBSFN subframe when data is scheduled for a UE. In particular embodiments, an eNodeB may switch between the formats described with reference to FIGS. 4 and 5 based on load situation.

Figure 6:
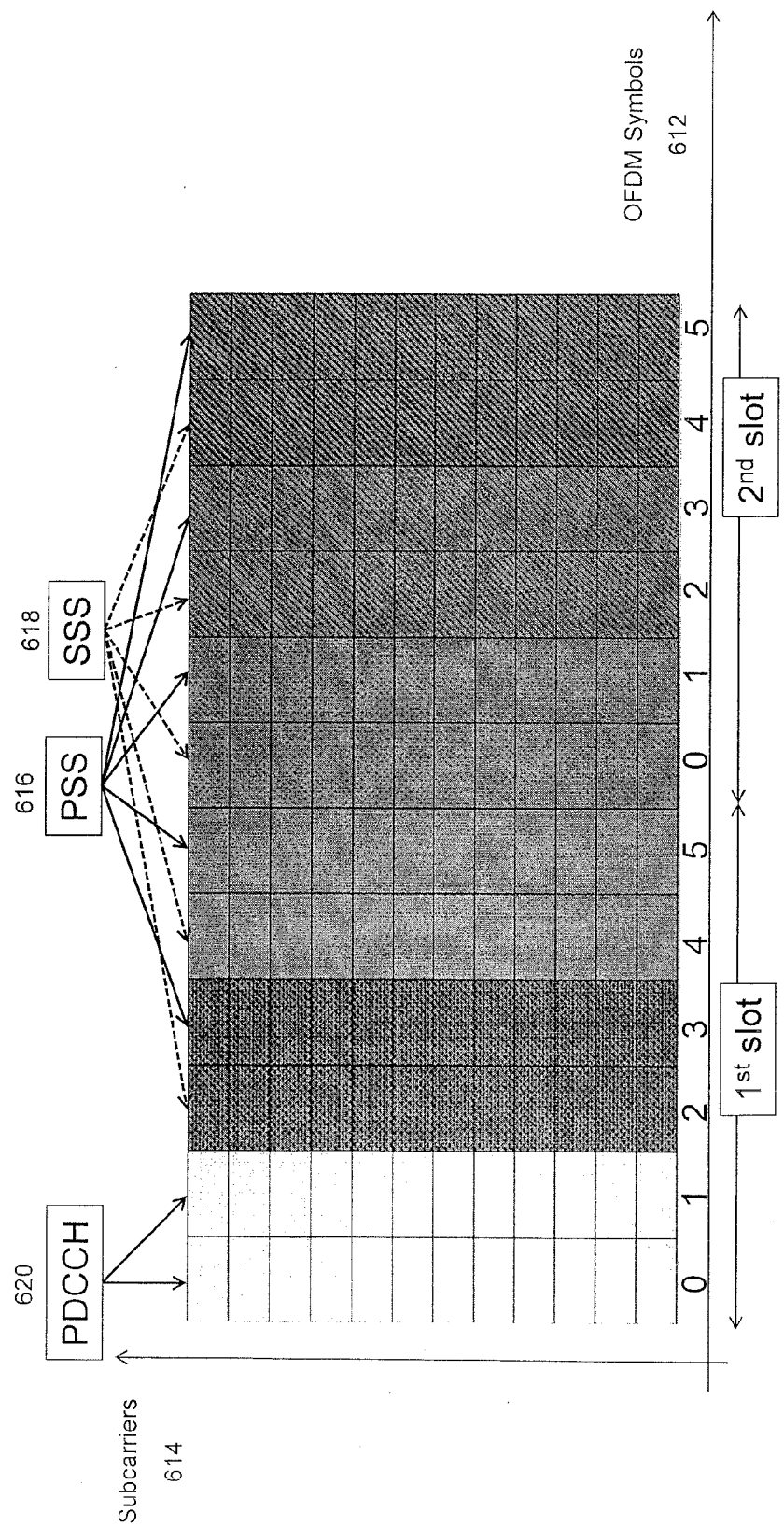
Figure 7:
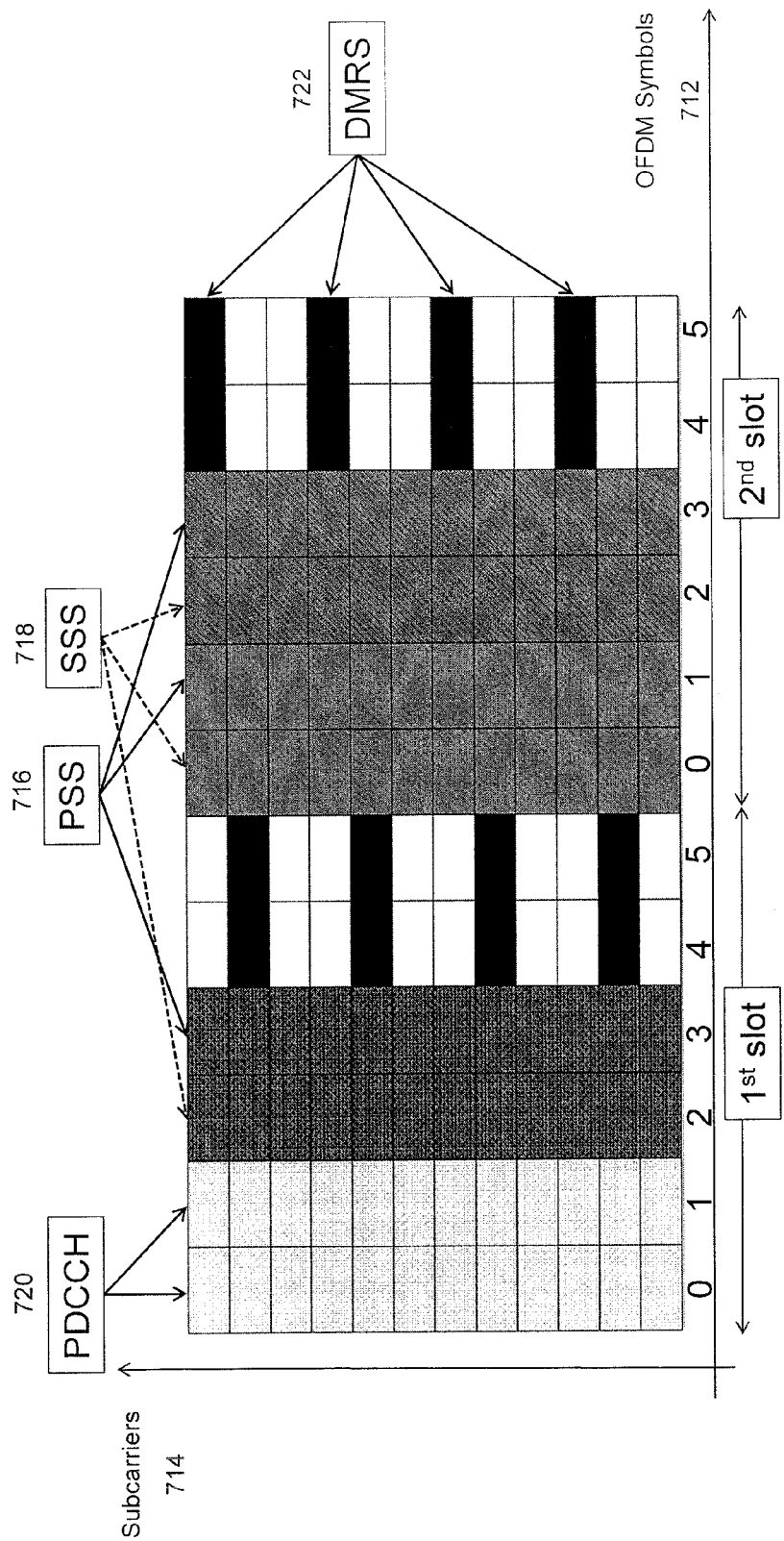

Particular embodiments may apply to extended cyclic prefix. FIGS. 6 and 7 are similar to FIGS. 4 and 5, except they illustrate examples of extended cyclic prefix.

FIG. 6 illustrates an example MBSFN cell search subframe format for FDD using extended cyclic prefix. FIG. 6 illustrates two slots of an example subframe. Each slot comprises a plurality of OFDM symbols 612, illustrated on the horizontal axis, and a plurality of subcarriers 614, illustrated on the vertical axis. The first two OFDM symbols of the first slot include PDCCH 620. The remaining OFDM symbols may include pairs of PSS 616 and SSS 618. Each slot of an extended cyclic prefix subframe includes fewer OFDM symbols than slots of a normal cyclic prefix subframe.

In the illustrated embodiment, the first slot includes a PSS/SSS pair in symbols 2 and 3 and another PSS/SSS pair in symbols 4 and 5. The second slot includes PSS/SSS pairs in symbols 0 and 1, 2 and 3, and 4 and 5.

FIG. 7 illustrates another example MBSFN cell search subframe format for FDD using extended cyclic prefix. FIG. 7 illustrates two slots of an example subframe. Each slot comprises a plurality of OFDM symbols 712, illustrated on the horizontal axis, and a plurality of subcarriers 714, illustrated on the vertical axis. The first two OFDM symbols of the first slot include PDCCH 720. Symbols 4 and 5 of both the first and second slots include DMRS 722. The remaining OFDM symbols may include pairs of PSS 716 and SSS 718.

In the illustrated embodiment, the first slot includes a PSS/SSS pair in symbols 2 and 3. The second slot includes PSS/SSS pairs in symbols 0 and 1, and 2 and 3.

Figure 8:
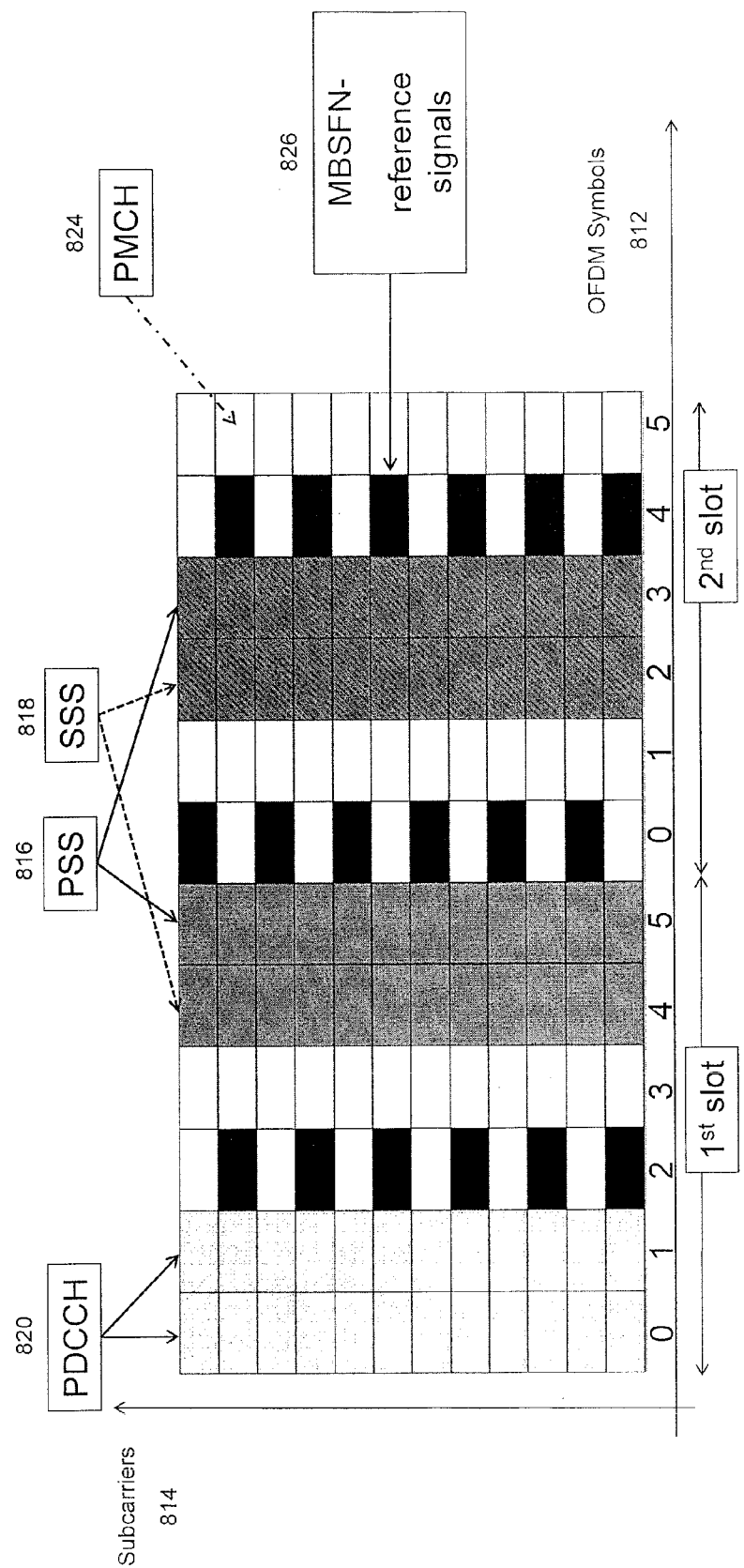

FIG. 8 illustrates an example MBSFN cell search subframe format for FDD using extended cyclic prefix and PMCH. FIG. 8 illustrates two slots of an example subframe. Each slot comprises a plurality of OFDM symbols 812, illustrated on the horizontal axis, and a plurality of subcarriers 814, illustrated on the vertical axis. The first two OFDM symbols of the first slot include PDCCH 820. PMCH 824 is mapped to the MBSFN subframe and thus OFDM symbol 2 in the first slot and OFDM symbols 0 and 4 in the second slot include MBSFN reference signals. In this example the entire subframe uses extended cyclic prefix because the MBSFN reference signals are only defined for extended cyclic prefix. The remaining OFDM symbols may include pairs of PSS 716 and SSS 718.

In the illustrated embodiment, the first slot includes a PSS/SSS pair in symbols 4 and 5. The second slot includes a PSS/SSS pair in symbols 2 and 3.

Particular embodiments may apply to TDD. FIGS. 9-13 illustrate TDD examples.

Figure 9:
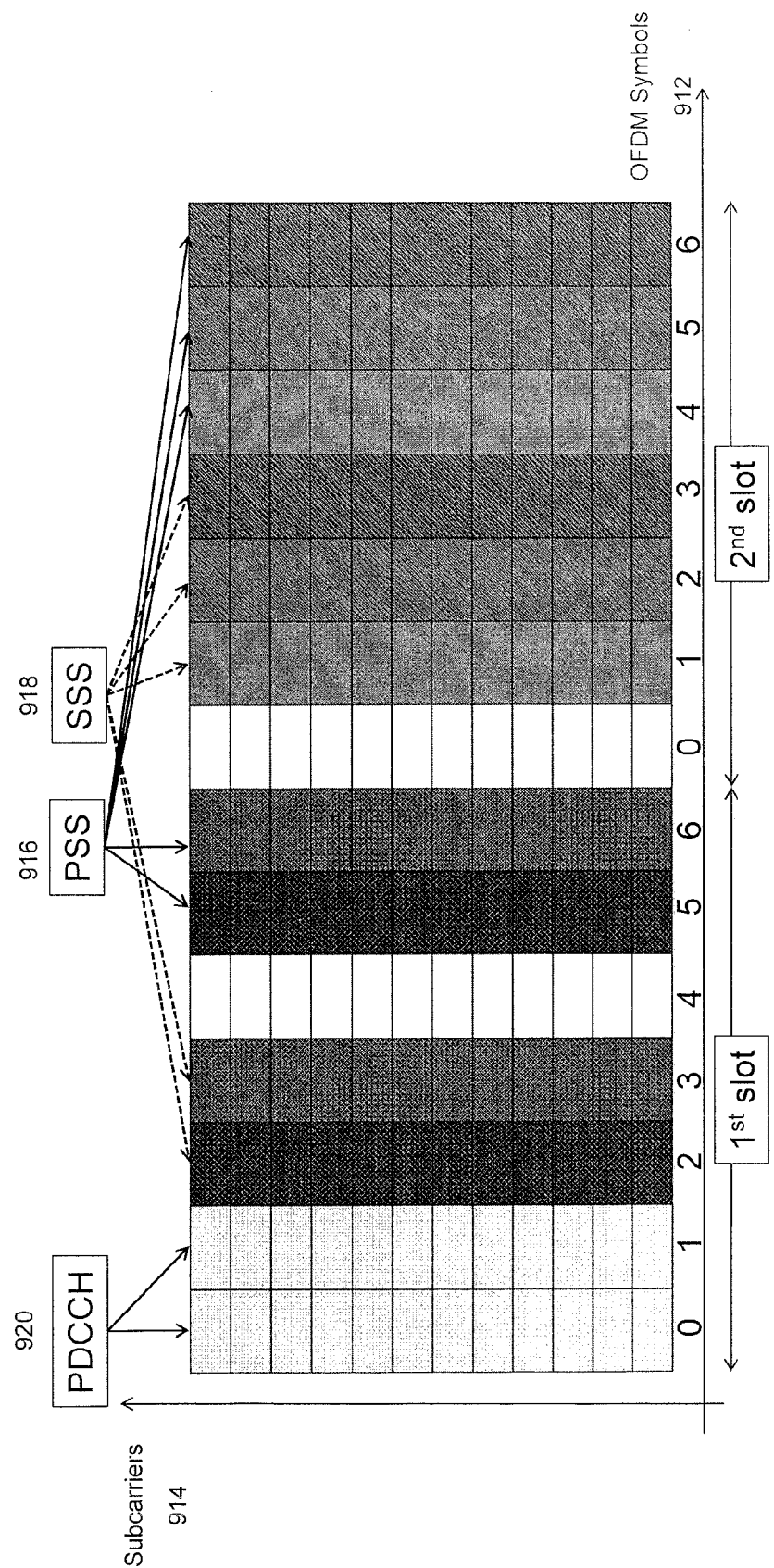

FIG. 9 illustrates an example MBSFN cell search subframe format for TDD using normal cyclic prefix. FIG. 9 illustrates two slots of an example subframe. Each slot comprises a plurality of OFDM symbols 912, illustrated on the horizontal axis, and a plurality of subcarriers 914, illustrated on the vertical axis. The first two OFDM symbols of the first slot include PDCCH 920. The remaining OFDM symbols may include pairs of PSS 9416 and SSS 918.

In the illustrated embodiment, the first slot includes a PSS/SSS pair in symbols 2 and 5 and another PSS/SSS pair in symbols 3 and 6. The second slot includes PSS/SSS pairs in symbols 1 and 4, 2 and 5, and 3 and 6.

In the illustrated embodiment, the PSS/SSS pairs are shown separated by two OFDM symbols with the SSS transmitted before the PSS. In particular embodiments, a UE may distinguish between duplex modes (i.e., FDD or TDD) based on the separation.

In particular embodiments, the PSS/SSS pairs may include any suitable separation. In particular embodiments, PSS may be transmitted before SSS. Particular embodiments may include any suitable combination. For example, some PSS/SSS pairs within the subframe may transmit SSS before PSS and others may transmit after.

Figure 10:
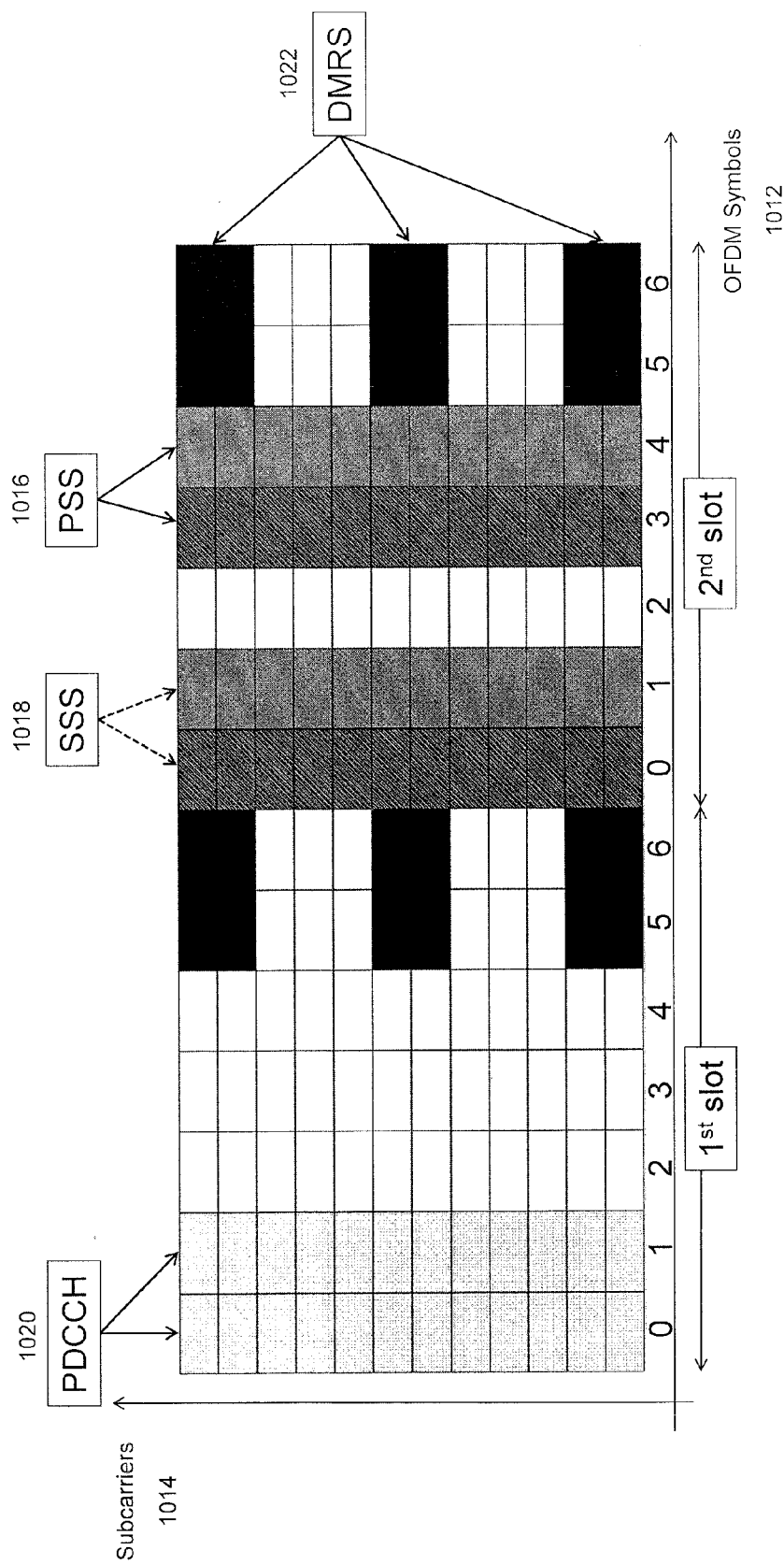

The example in FIG. 9 illustrates an embodiment where the MBSFN subframe is only used for PSS/SSS transmission. FIG. 10 illustrates an example embodiment with unicast data included in the resource elements. DMRS is mapped to the MBSFN subframe to support demodulation of the unicast data.

FIG. 10 illustrates another example MBSFN cell search subframe format for TDD using normal cyclic prefix. FIG. 10 illustrates two slots of an example subframe. Each slot comprises a plurality of OFDM symbols 1012, illustrated on the horizontal axis, and a plurality of subcarriers 1014, illustrated on the vertical axis. The first two OFDM symbols of the first slot include PDCCH 1020. Symbols 5 and 6 of both the first and second slots include DMRS 1022. The remaining OFDM symbols may include pairs of PSS 1016 and SSS 1018.

In the illustrated embodiment, the second slot includes PSS/SSS pairs in symbols 0 and 3, and 1 and 4. In particular embodiments, the PSS/SSS pairs may include any suitable combination of symbols not occupied by PDCCH 1020 and DMRS 1022.

DMRS 1022 is only present in the MBSFN subframe when data is scheduled for a UE. In particular embodiments, an eNodeB may switch between the formats described with reference to FIGS. 9 and 10 based on load situation.

Figure 11:
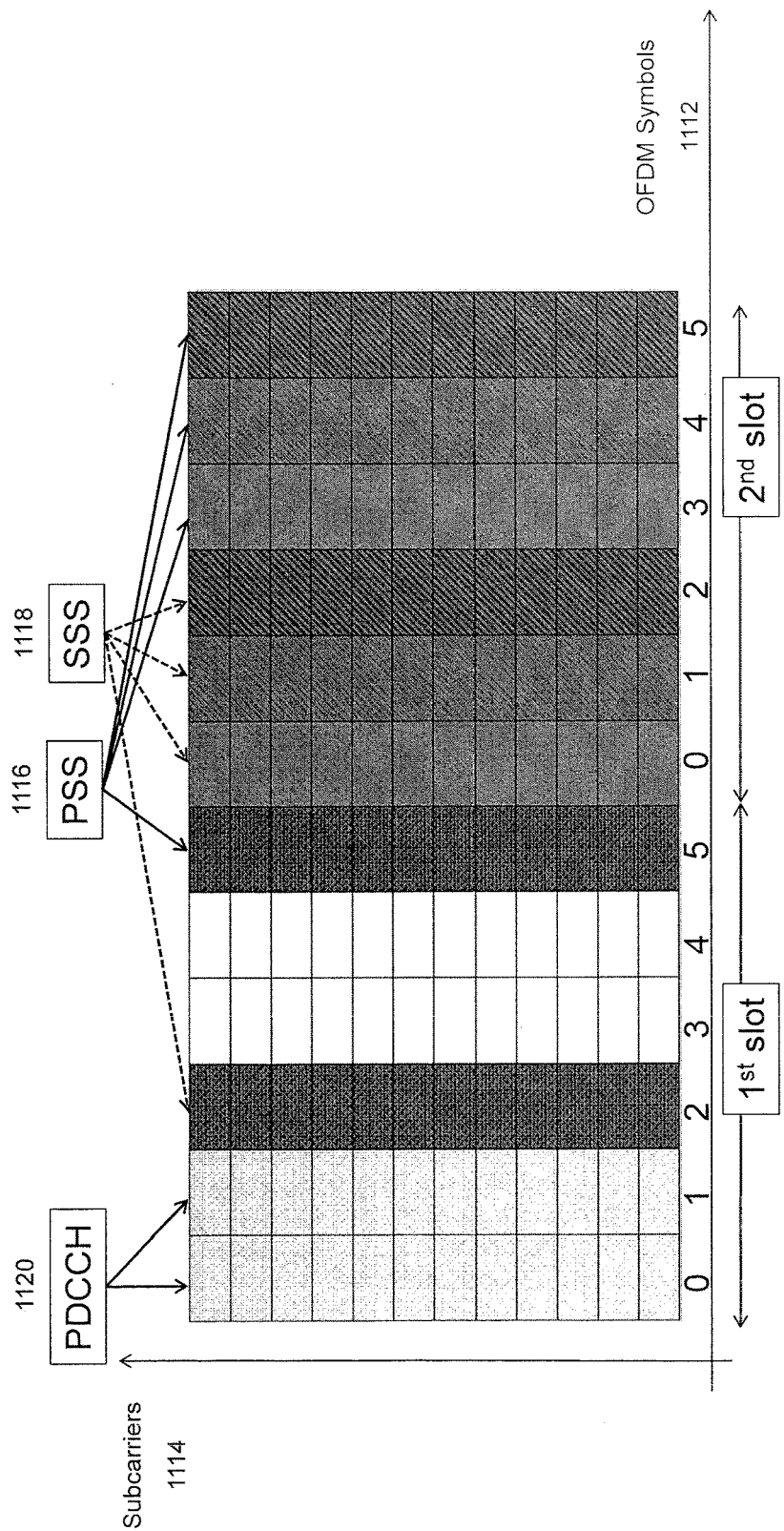
Figure 12:
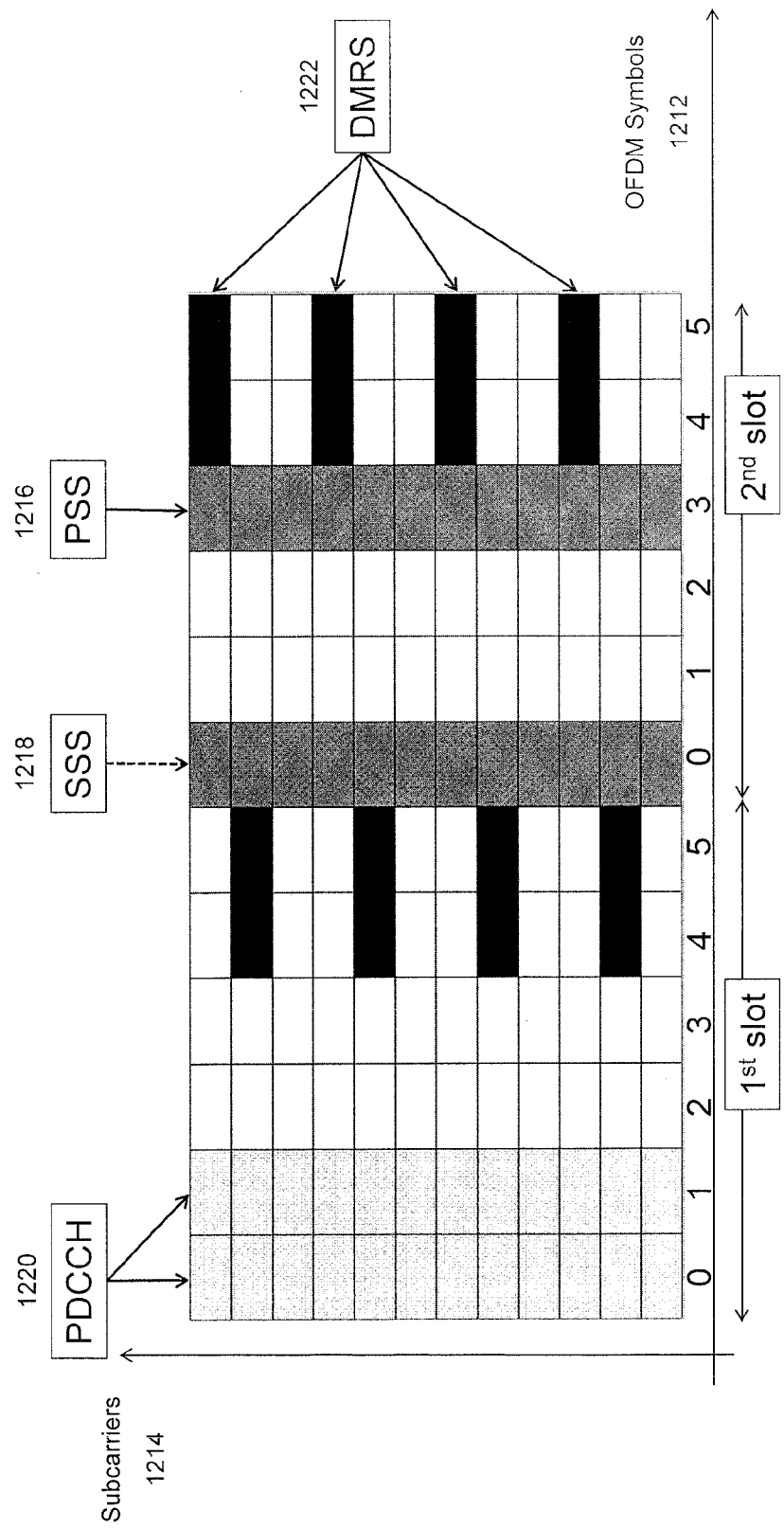

Particular PSS/SSS configurations may apply to extended cyclic prefix. FIGS. 11 and 12 are similar to FIGS. 9 and 10, except they illustrate examples of extended cyclic prefix.

FIG. 11 illustrates an example MBSFN cell search subframe format for TDD using extended cyclic prefix. FIG. 11 illustrates two slots of an example subframe. Each slot comprises a plurality of OFDM symbols 1112, illustrated on the horizontal axis, and a plurality of subcarriers 1114, illustrated on the vertical axis. The first two OFDM symbols of the first slot include PDCCH 1120. The remaining OFDM symbols may include pairs of PSS 1116 and SSS 1118. Each slot of an extended cyclic prefix subframe includes fewer OFDM symbols than slots of a normal cyclic prefix subframe.

In the illustrated embodiment, the first slot includes a PSS/SSS pair in symbols 2 and 5. The second slot includes PSS/SSS pairs in symbols 0 and 3, 1 and 4, and 3 and 5.

FIG. 12 illustrates another example MBSFN cell search subframe format for TDD using extended cyclic prefix. FIG. 12 illustrates two slots of an example subframe. Each slot comprises a plurality of OFDM symbols 1212, illustrated on the horizontal axis, and a plurality of subcarriers 1214, illustrated on the vertical axis. The first two OFDM symbols of the first slot include PDCCH 1220. Symbols 4 and 5 of both the first and second slots include DMRS 1222. The remaining OFDM symbols may include pairs of PSS 1216 and SSS 1218. In the illustrated embodiment, the second slot includes a PSS/SSS pair in symbols 0 and 3.

Figure 13:
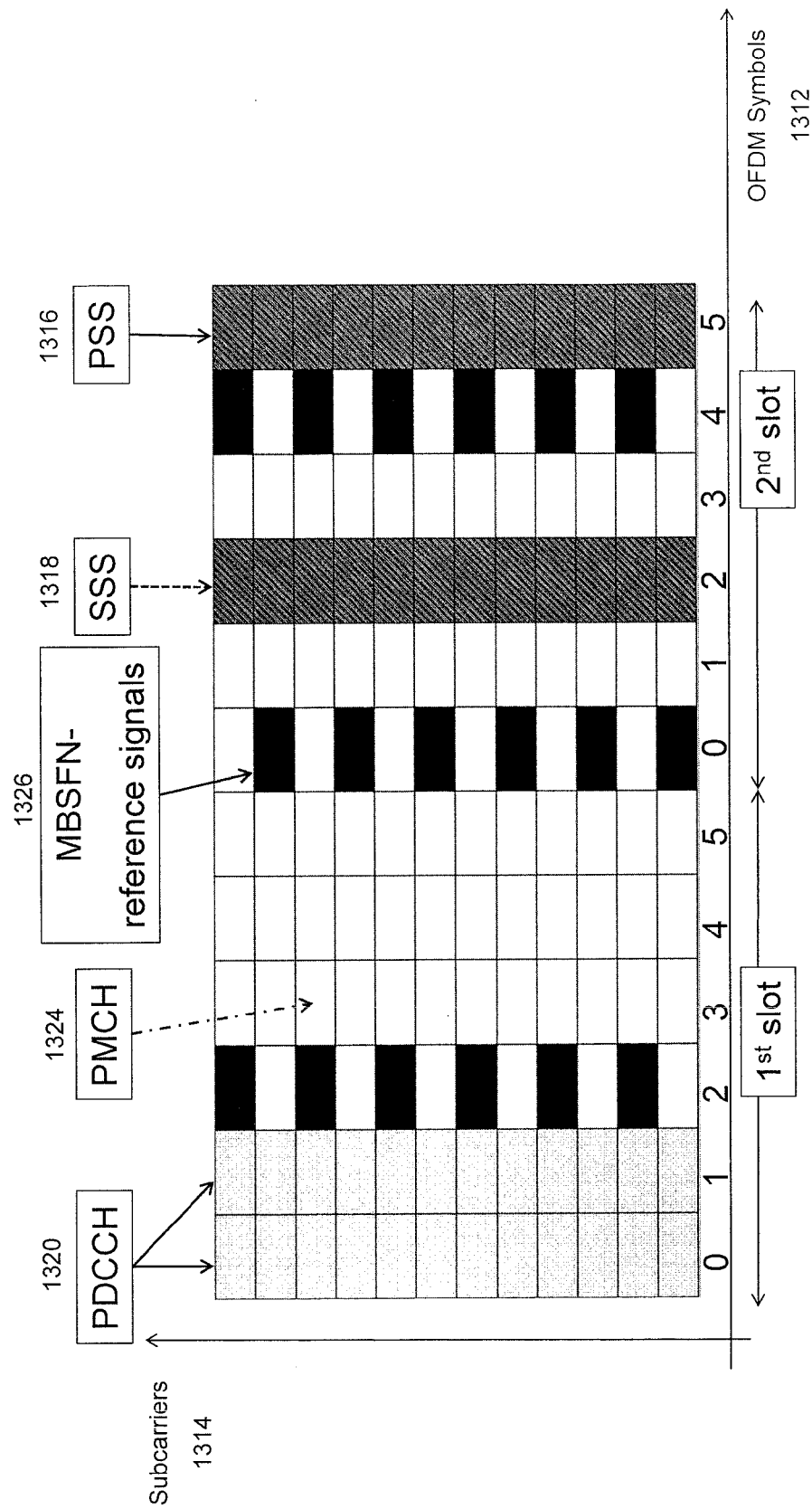

FIG. 13 illustrates an example MBSFN cell search subframe format for TDD using extended cyclic prefix and PMCH. FIG. 13 illustrates two slots of an example subframe. Each slot comprises a plurality of OFDM symbols 1312, illustrated on the horizontal axis, and a plurality of subcarriers 1314, illustrated on the vertical axis. The first two OFDM symbols of the first slot include PDCCH 1320. PMCH 1324 is mapped to the MBSFN subframe and thus OFDM symbol 2 in the first slot and OFDM symbols 0 and 4 in the second slot include MBSFN reference signals. In this example the entire subframe uses extended cyclic prefix because the MBSFN reference signals are only defined for extended cyclic prefix. The remaining OFDM symbols may include pairs of PSS 1316 and SSS 1318. In the illustrated embodiment, the second slot includes a PSS/SSS pair in symbols 2 and 5.

Particular embodiments may recognize an advantage of additional PSS/SSS pairs that outweighs any disadvantage of locating the corresponding PSS and SSS in different slots. In such embodiments, additional PSS/SSS pairs may be added. For example, with respect to FIG. 4 or 6, an additional PSS may be included in OFDM symbol 6 in the first slot and a corresponding SSS may be included in OFDM symbol 0 in the second slot. As another example, with respect to FIG. 13, an additional PSS may be included in OFDM symbol 4 in the first slot and a corresponding SSS may be included in OFDM symbol 1 in the second slot.

Although particular PSS/SSS patterns are illustrated above, additional patterns will be apparent to those skilled in the art. Furthermore, any of the patterns described above, or combination of patterns, may be repeated in other subframes within the frame.

Figure 14:
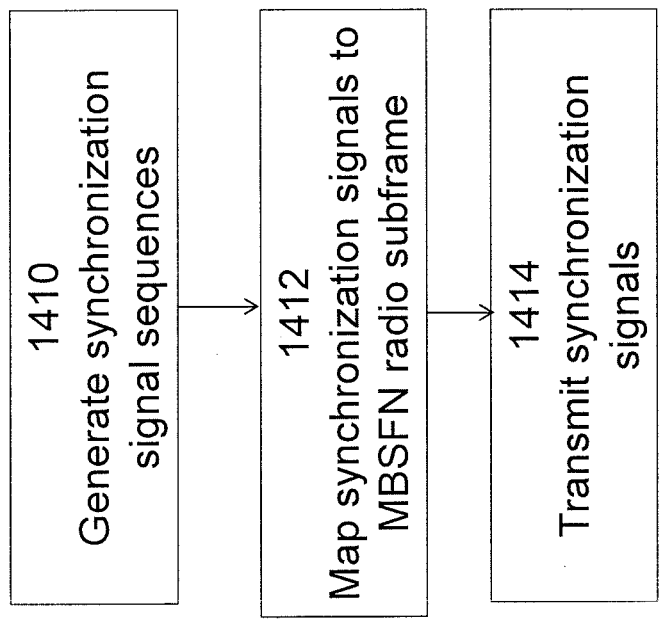
FIG. 14 is a flowchart of an example method of transmitting PSS and SSS, according to particular embodiments.

FIG. 14 is a flowchart of an example method of transmitting PSS and SSS, according to particular embodiments. In particular embodiments, one or more steps of the method may be performed by components of network 100 described with reference to FIGS. 1-17.

The method begins at step 1410, where a network node generates synchronization signals. For example, radio network node 120 may generate a plurality of PSS sequences and SSS sequences. Each PSS sequence is paired with an SSS sequence to form a PSS/SSS pair. In particular embodiments, a first PSS sequence and a second PSS sequence may comprise identical sequences. In particular embodiments, a first SSS sequence and a second SSS sequence may comprise different sequences.

At step 1412, the network node maps the synchronization signals to MBSFN radio subframes. For example, radio network node 120 may map the plurality of PSS/SSS pairs to a subframe according to any one of the frame formats described above, such as those described with respect to FIGS. 4-13. In particular embodiments, radio network node 120 may map PSS/SSS pairs to more than one subframe or repeat a mapping or combination of mappings in multiple subframes. In particular embodiments, radio network node 120 may map a legacy PSS/SSS pair in a particular subframe and additional PSS/SSS pairs in MBSFN subframes.

At step 1414, the network node transmits the synchronization signals. For example, radio network node 120 transmits the radio frame comprising the MBSFN subframes with the mapping of PSS/SSS pairs. In particular embodiments, radio network node 120 may perform directional signal transmission. For example, radio network node 120 may transmit a first PSS/SSS pair in a first direction and a second PSS/SSS pair in a second direction. In particular embodiments, radio network node 120 may transmit a first PSS/SSS pair in different directions over time.

Modifications, additions, or omissions may be made to the method of FIG. 14. Additionally, one or more steps in the method of FIG. 14 may be performed in parallel or in any suitable order. The method may be repeated as necessary over time.

Figure 15:
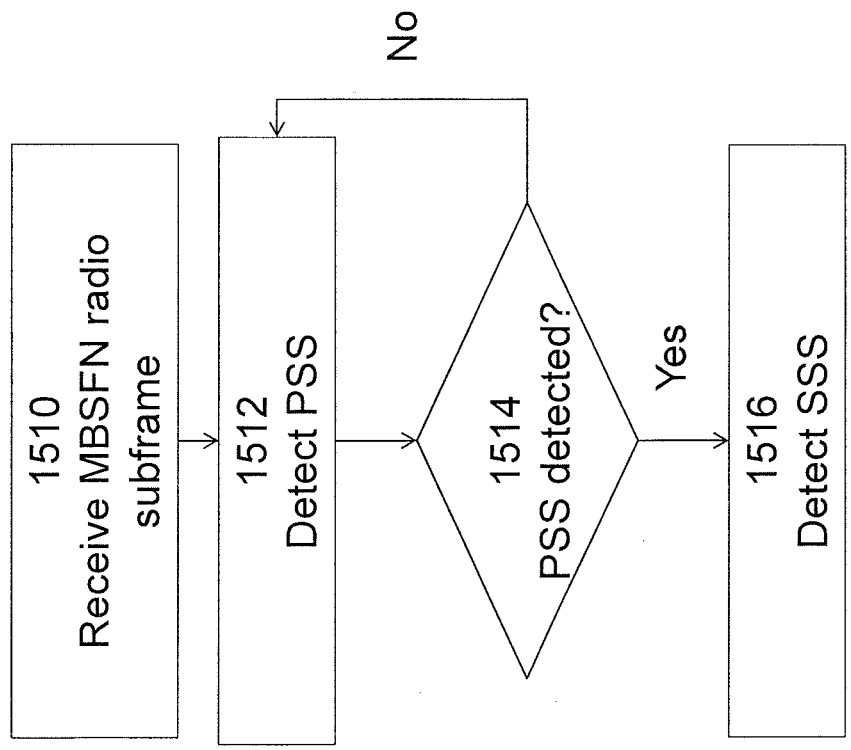
FIG. 15 is a flowchart of an example method of detecting PSS and SSS, according to particular embodiments.

FIG. 15 is a flowchart of an example method of detecting PSS and SSS, according to particular embodiments. In particular embodiments, one or more steps of the method may be performed by components of network 100 described with reference to FIGS. 1-17.

The method begins at step 1510, where a wireless device receives signals transmitted from a radio network node. For example, wireless device 110 may receive wireless signal 130 from radio network node 120. Wireless signal 130 may comprise an MBSFN subframe including primary and secondary cell search signals. For example, wireless signal 130 may comprise a plurality of PSS/SSS pairs according to any one of the frame formats described above with respect to FIGS. 4-13.

At step 1512, the wireless device tries to detect a PSS sequence, such as a PSS sequence according to one of the formats described herein. In particular embodiments, wireless device 110 may accumulate multiple PSS received within a MBSFN subframe or received across multiple subframes. A particular advantage is that wireless device 110 may combine signals to create a stronger signal.

In particular embodiments, radio network node 120 may transmit a first PSS in a first direction and a second PSS in a second direction. A particular advantage of this transmission method is that wireless device 110 may receive a stronger PSS when radio network node 120 transmits the PSS in the direction of wireless device 110.

If, at step 1514, wireless device 110 successfully detects PSS, then the method continues to step 1516. If wireless device 110 does not successfully detect PSS, then the method returns to step 1512 where wireless device 110 may try to detect another PSS sequence in the received MBSFN subframe. In other embodiments, if wireless device 110 does not successfully detect PSS, then the method returns to step 1512 and continues to receive signals from network node 120.

At step 1516, the wireless device tries to detect an SSS sequence according to one of the formats described herein. Similar to detecting the PSS, the wireless device may accumulate multiple SSS and the radio network node may transmit different SSS in different directions. After detecting both primary and secondary cell search signals, the method is complete.

Modifications, additions, or omissions may be made to the method of FIG. 15. Additionally, one or more steps in the method of FIG. 15 may be performed in parallel or in any suitable order. The method may be repeated as necessary over time, such as when a wireless device travels into a new cell coverage area.

FIG. 16 is a block diagram illustrating an example embodiment of a wireless device. The wireless device is an example of the wireless devices 110 illustrated in FIG. 3. Particular examples include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. The wireless device includes transceiver 1610, processor 1620, and memory 1630. In some embodiments, transceiver 1610 facilitates transmitting wireless signals to and receiving wireless signals from wireless network node 120 (e.g., via an antenna), processor 1620 executes instructions to provide some or all of the functionality described herein as provided by the wireless device, and memory 1630 stores the instructions executed by processor 1620.

Processor 1620 includes any suitable combination of hardware and software implemented in one or more integrated circuits or modules to execute instructions and manipulate data to perform some or all of the described functions of the wireless device. Memory 1630 is generally operable to store computer executable code and data. Examples of memory 1630 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In particular embodiments, processor 1620 in communication with transceiver 1610 receives cell search signals from radio network node 120. Other embodiments of the wireless device may include additional components (beyond those shown in FIG. 16) responsible for providing certain aspects of the wireless device's functionality, including any of the functionality described above and/or any additional functionality (including any functionality necessary to support the solution described above).

FIG. 17 is a block diagram illustrating an example embodiment of a radio network node. Radio network node 120 can be an eNodeB, a node B, a base station, a wireless access point (e.g., a Wi-Fi access point), a low power node, a base transceiver station (BTS), a transmission point or node, a remote RF unit (RRU), a remote radio head (RRH), or other radio access node. Radio network node 120 includes at least one transceiver 1710, at least one processor 1720, at least one memory 1730, and at least one network interface 1740. Transceiver 1710 facilitates transmitting wireless signals to and receiving wireless signals from a wireless device, such as wireless devices 110 (e.g., via an antenna); processor 1720 executes instructions to provide some or all of the functionality described above as being provided by a radio network node 120; memory 1730 stores the instructions executed by processor 1720; and network interface 1740 communicates signals to backend network components, such as a gateway, switch, router, Internet, Public Switched Telephone Network (PSTN), controller, and/or other radio network nodes 120. Processor 1720 and memory 1730 can be of the same types as described with respect to processor 1620 and memory 1630 of FIG. 16 above.

In some embodiments, network interface 1740 is communicatively coupled to processor 1720 and refers to any suitable device operable to receive input for radio network node 120, send output from radio network node 120, perform suitable processing of the input or output or both, communicate to other devices, or any combination of the preceding. Network interface 1740 includes appropriate hardware (e.g., port, modem, network interface card, etc.) and software, including protocol conversion and data processing capabilities, to communicate through a network.

In particular embodiments, processor 1720 in communication with transceiver 1710 transmits, to wireless device 110, cell search signals. In particular embodiments, processor 1720 in communication with transceiver 1710 transmits cell search signals such as the PSS and SSS described above to wireless device 110.

Other embodiments of radio network node 120 include additional components (beyond those shown in FIG. 17) responsible for providing certain aspects of the radio network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Some embodiments of the disclosure may provide one or more technical advantages. As an example, in some embodiments, the methods and apparatus disclosed herein may facilitate detecting synchronization signals in a low SINR environment. Cell search procedure may be performed more efficiently to improve overall system performance.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP 3rd Generation Partnership Project
CP Cyclic Prefix
CRS Cell-Specific Reference Signal
DMRS Demodulation Reference Signal
eNB Enhanced Node-B
eNodeB Enhanced Node-B
ePDCCH Enhance Physical Downlink Control Channel
FDD Frequency Division Duplex
LTE Long Term Evolution
MBSFN Multimedia Broadcast Single-Frequency Network
OFDM Orthogonal Frequency-Division Multiplexing
PBCH Physical Broadcast Channel
PCFICH Physical Control Format Indicator Channel
PDCCH Physical Downlink Control Channel
PDSCH Physical Downlink Shared Channel
PMCH Physical Multicast Channel
ppm Part Per Million
PSS Primary Synchronization Signal
RE Resource Element
RB Resource Block
SINR Signal to Interference and Noise Ratio
SNR Signal to Noise Ratio
SSS Secondary Synchronization Signal
TDD Time Division Duplexing
UE User Equipment

The invention claimed is:

1. A method of synchronizing a wireless device with a network node, the method comprising:
   receiving, at the wireless device, a Multimedia Broadcast Multicast Services Single-Frequency Network (MBSFN) radio subframe transmitted from the network node, the MBSFN radio subframe comprising a first Primary Synchronization Signal (PSS) associated with a first Orthogonal Frequency Division Multiplexing (OFDM) symbol and paired with a first Secondary Synchronization Signal (SSS) associated with a second OFDM symbol, and a second PSS associated with a third OFDM symbol and paired with a second SSS associated with a fourth OFDM symbol,
      wherein the MBSFN radio subframe further comprising Demodulation Reference Signals (DMRS) to support demodulation of unicast data, and
      wherein the first and second OFDM symbols do not include OFDM symbols that include DMRS;
   detecting the first PSS and the second PSS within the MBSFN radio subframe;
   detecting the first SSS and the second SSS within the MBSFN radio subframe,
      wherein the first PSS and the first SSS are associated with adjacent OFDM symbols;
   coherently accumulating the first PSS and the second PSS to determine an accumulated PSS; and
   determining system information associated with the network node based on the accumulated PSS and the detected SSS,
      wherein the MBSFN radio subframe is transmitted from the network node without a physical multicast Channel (PMCH).

2. The method of claim 1, wherein the first and second OFDM symbols do not include OFDM symbols that include MBSFN reference signals.

3. The method of claim 1, wherein the first SSS and the second SSS comprise different sequences.

4. The method of claim 1, wherein the first SSS is transmitted before the first PSS.

5. The method of claim 1, further comprising:
    detecting both the first SSS and the second SSS within the MBSFN radio subframe;
    coherently accumulating the first SSS and the second SSS to determine an accumulated SSS; and
    determining system information associated with the network node based on the accumulated first SSS and second SSS.

6. A method of transmitting synchronization signals in a wireless network, the method comprising:
    generating a first Primary Synchronization Signal (PSS) comprising a first synchronization sequence and a first Secondary Synchronization Signal (SSS) comprising a second synchronization sequence;
    generating a second PSS comprising a third synchronization sequence and a second SSS comprising a fourth synchronization sequence;
    mapping the first PSS and first SSS to a Multimedia Broadcast Multicast Services Single-Frequency Network (MBSFN) radio subframe without a physical multicast channel (PMCH),
        wherein the first PSS is associated with a first Orthogonal Frequency Division Multiplexing (OFDM) symbol and paired with the first SSS associated with a second OFDM symbol,
        wherein the first PSS and the first SSS are associated with adjacent OFDM symbols;
    mapping the second PSS and second SSS to the MBSFN radio subframe,
        wherein the second PSS is associated with a third OFDM symbol and paired with the second SSS associated with a fourth OFDM symbol;
    mapping Demodulation Reference Signals (DMRS) to the MBSFN radio subframe to support demodulation of unicast data,
        wherein the first and second OFDM symbols do not include OFDM symbols that include DMRS; and
    transmitting the MBSFN radio subframe.

7. The method of claim 6, further comprising transmitting the first PSS in a first direction and the second PSS in a second direction.

8. The method of claim 6, further comprising transmitting the first SSS in a first direction and the second SSS in a second direction.

9. A wireless device comprising a processor operable to:
    receive a Multimedia Broadcast Multicast Services Single-Frequency Network (MBSFN) radio subframe transmitted from a network node, the MBSFN radio subframe comprising a first Primary Synchronization Signal (PSS) associated with a first Orthogonal Frequency Division Multiplexing (OFDM) symbol and paired with a first Secondary Synchronization Signal (SSS) associated with a second OFDM symbol and paired with a first Secondary Synchronization Signal (SSS) associated with a second OFDM symbol, and a second PSS associated with a third OFDM symbol and paired with a second SSS associated with a fourth OFDM symbol,
        wherein the MBSFN radio subframe further comprising Demodulation Reference Signals (DMRS) to support demodulation of unicast data, and
        wherein the first and second OFDM symbols do not include OFDM symbols that include DMRS;
    detect the first PSS and the second PSS within the MBSFN radio subframe;
    detect the first SSS and the second SSS within the MBSFN radio subframe,
        wherein the first PSS and the first SSS are associated with adjacent OFDM symbols;
    coherently accumulating the first PSS and the second PSS to determine an accumulated PSS; and
    determining system information associated with the network node based on the accumulated PSS and the detected SSS,
        wherein the radio subframe is transmitted from the network node without a physical multicast Channel (PMCH).

10. The wireless device of claim 9, wherein the first and second OFDM symbols do not include OFDM symbols that include MBSFN reference signals.

11. The wireless device of claim 9, wherein the first SSS and the second SSS comprise different sequences.

12. The method of claim 9, wherein the first SSS is transmitted before the first PSS.

13. The wireless device of claim 9, wherein the processor is further operable to:
    detect both the first SSS and the second SSS within the radio subframe;
    accumulate the first SSS and the second SSS; and
    determine system information associated with the network node based on the
    accumulated first SSS and second SSS.

14. A network node comprising a processor operable to:
    generate a first Primary Synchronization Signal (PSS) comprising a first synchronization sequence and a first Secondary Synchronization Signal (SSS) comprising a second synchronization sequence;
    generate a second PSS comprising a third synchronization sequence and a second SSS comprising a fourth synchronization sequence;
    map the first PSS and the first SSS to a Multimedia Broadcast Multicast Services Single-Frequency Network (MBSFN) radio subframe without a physical multicast channel (PMCH),
        wherein the first PSS is associated with a first Orthogonal Frequency Division Multiplexing (OFDM) symbol and paired with the first SSS associated with a second OFDM symbol,
        wherein the first PSS and the first SSS are associated with adjacent OFDM symbols;
    map the second PSS and second SSS to the MBSFN radio subframe,
        wherein the second PSS is associated with a third OFDM symbol and paired with the second SSS associated with a fourth OFDM symbol;
    map Demodulation Reference Signals (DMRS) to the MBSFN radio subframe to support demodulation of unicast data; wherein the first and second OFDM symbols do not include OFDM symbols that include DMRS; and
    transmit the MBSFN radio subframe.

15. The network node of claim 14, the processor further operable to transmit the first PSS in a first direction and transmit the second PSS in a second direction.

16. The network node of claim 14, the processor further operable to transmit the first SSS in a first direction and transmit the second SSS in a second direction.

* * * * *